United States Patent [19]

Hewitt

[11] Patent Number: 4,823,397
[45] Date of Patent: Apr. 18, 1989

[54] TRANSCEIVER WITH MOISTURE RESISTANT COVER FOR THUMBWHEELS AND THE LIKE

[75] Inventor: Robert M. Hewitt, Fort Lauderdale, Fla.

[73] Assignee: Southern Marine Research, Inc., Miami, Fla.

[21] Appl. No.: 150,024

[22] Filed: Jan. 29, 1988

[51] Int. Cl.$^4$ .......................... H04B 1/38; H04B 1/08
[52] U.S. Cl. .......................................... 455/89; 455/90; 455/95; 455/347; 200/302.3; 74/553; D14/137
[58] Field of Search ................... 455/89, 90, 95, 117, 455/128, 217, 347, 351; 200/5 A, 5 SE, 302.1–302.3; 340/365 R, 365 S; 361/398, 344, 422, 424, 350, 351; 312/7.1; 74/552–554, 558, 558.5; 379/369; 334/85; D14/68, 62, 64, 66

[56] References Cited

U.S. PATENT DOCUMENTS

| 2,539,386 | 1/1951 | Albert . | |
|---|---|---|---|
| 3,277,739 | 10/1966 | Morse . | |
| 3,928,742 | 12/1975 | Rule | 200/302.3 |
| 3,959,610 | 5/1976 | Finnegan et al. | 455/90 |
| 4,280,226 | 7/1981 | Jenkins . | |
| 4,340,791 | 7/1982 | Sorenson | 200/302.3 |
| 4,408,346 | 10/1983 | Bauer | 334/85 |
| 4,456,797 | 6/1984 | Olsen | 455/351 |
| 4,532,817 | 8/1985 | Chaki | 74/553 |
| 4,621,373 | 11/1986 | Hodsdon | 455/90 |
| 4,621,539 | 11/1986 | Aoki | 74/553 |
| 4,682,363 | 7/1987 | Goldfarb et al. | 455/90 |
| 4,772,767 | 9/1988 | Sawada | 200/302.3 |

FOREIGN PATENT DOCUMENTS 8100654 3/1981 European Pat. Off. .

*Primary Examiner*—Robert L. Griffin
*Assistant Examiner*—Curtis Kuntz

[57] ABSTRACT

A hand-held radio has thumbwheels for channel selection extending outwardly of an aperture in the top panel of the case, and a cover of resiliently deflectable transparent synthetic resin is disposed thereover and effects a seal thereabout to substantially prevent rain and spray from entering the interior through the apertures about the thumbwheels. The cover has a pedestal portion with a top wall spaced above the thumbwheels and with an inclined sidewall which is spaced laterally outwardly from the thumbwheels, and a peripheral flange extends about the base of the sidewall. A clamping plate has an aperture through which the pedestal portion extends, and it overlies the flange of the cover. Fasteners seated in the clamping plate tightly clamp the flange of the cover against the top panel of the case to effect a seal. The user is able to deflect the cover top wall downwardly and then laterally to rotate the thumbwheels.

9 Claims, 1 Drawing Sheet

TRANSCEIVER WITH MOISTURE RESISTANT COVER FOR THUMBWHEELS AND THE LIKE

BACKGROUND OF THE INVENTION

The present invention relates to handheld radios of the type having rotatable thumbwheels for channel selection and, more particularly, to marine transceivers having a moisture-resistant cover over the thumbwheels to prevent entry of rain, spray and other contaminants into the electronics in the interior of the transceiver.

Handheld radio transceivers are widely employed for communications purposes, both on land and at sea. Various techniques are utilized for effecting channel selection including digital key pads and rotatable thumbwheels. Because it is necessary to manipulate the rotatable thumbwheels, they extend outwardly through apertures in the case surrounding the electronics, and these apertures provide a path for rain, spray and contaminants to enter into the case, interface with operation and ultimately degrade the electronic components therewithin. As a result, some users lace the entire radio within a rubber or plastic bag to provide some protection. Frequently, the user attempts to manipulate the thumbwheels and switches through the plastic bag which will at times rupture as a result of its abrasion against the thumbwheels and lose its effectiveness as a "seal".

It is an object of the present invention to provide a novel handheld radio in which there is a transparent cover overlying the thumbwheels to provide an effective seal for the apertures through the case and affording the means for manipulation of the thumbwheels by the user.

It is also an object to provide such a handheld radio in which the cover may be readily fabricated, is long lived, and is readily deflected by the user to effect engagement with the thumbwheels for rotation thereof.

Another object is to provide such an handheld radio in which the components may be fabricated relatively economically and easily assembled to provide a long lived and relatively attractive assembly.

SUMMARY OF THE INVENTION

It has now been found that certain of the foregoing and related objects of the invention are readily attained in a handheld radio which has a frame supporting electronic components and a case surrounding the frame including a top panel with at least one opening therethrough. A multiplicity of thumbwheels are rotatably supported in the case and have a circumferential portion extending through the opening in the top panel.

A resiliently deflectable cover is disposed on the top panel and has a pedestal portion overlying the thumbwheels with a top wall spaced thereabove and a depending sidewall extending thereabout. The cover also has a flange extending outwardly about the periphery of the sidewall and along a portion of the surface of the top panel. The cover is fabricated from a relatively transparent synthetic resin so as to be readily deflectable by a finger of the user of the radio to depress the top wall into frictional engagement with a thumbwheel and thence movable laterally to effect rotation thereof.

A clamping plate overlies the flange of the cover and has an aperture therein through which the pedestal portion extends, and fasteners extend through the clamping plate and cover and into the top panel to provide sealing engagement between the flange and the top panel to prevent rain and spray from entering the case about the thumbwheels.

Desirably, the radio includes toggle switches projecting through apertures in the top panel and the top wall of the cover overlies the switches for manipulation thereby. The resin of the cover is a silicone rubber, and the cover has a thickness of about 0.4 mm–0.9 mm.

Preferably, the sidewall has a height of 4.0 mm–10.0 mm and is spaced above the thumbwheels about 3.0–9.0 mm. The sidewall of the cover is spaced laterally outwardly from the centerline of the thumbwheels at least about 7.0 mm. In its most desirable embodiment, the cover is elongated and the pedestal portion has a portion of enlarged transverse dimension adjacent the thumbwheels to provide lateral clearance. The top panel has a recess extending about the opening therein and the flange of the cover seats therein. The radio additionally includes at least one toggle switch projecting upwardly through an opening in the top panel spaced from the thumbwheels and the pedestal portion overlies the switch.

DETAILED DESCRIPTION OF THE ILLUSTRATED EMBODIMENT

Figure 2:
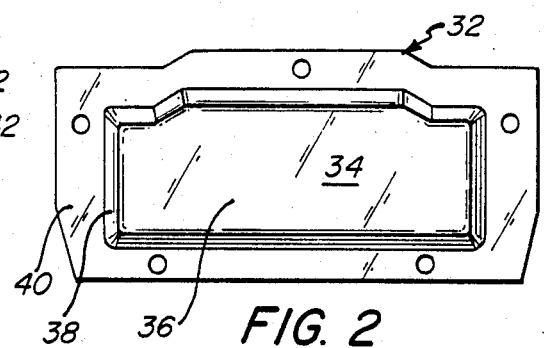
FIG. 2 is an enlarged top plan view of the transparent cover thereof.
Figure 1:
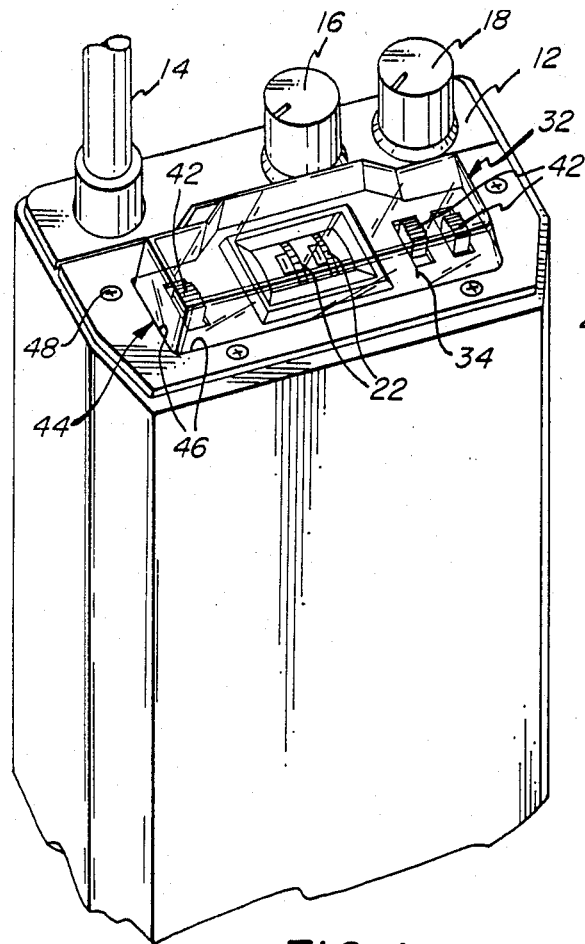
FIG. 1 is a fragmentary perspective view of a marine transceiver embodying the present invention and wherein the portion underlying the transparent cover is illustrated.
Figure 3:
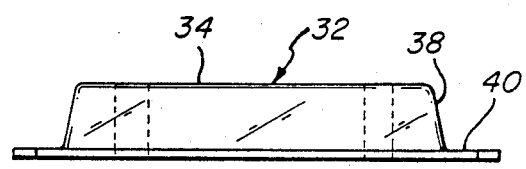
FIG. 3 is a front elevational view of the cover.
Figure 4:
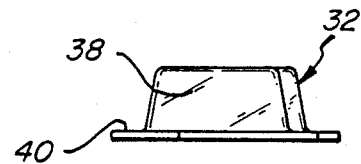
FIG. 4 is an end elevational view of the cover as seen from the right side of the transceiver in FIG. 1.

Turning first to FIG. 1, therein illustrated is a marine transceiver embodying the present invention with a case or housing or case generally designated by the numeral 10, having a top panel 12 on which are mounted a fragmentarily illustrated antenna 14, an "on-off" switch 16, and a volume control knob 18.

Figure 5:
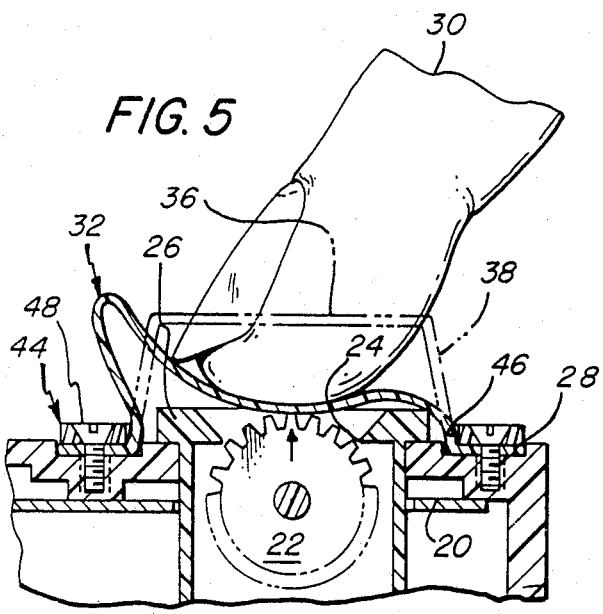
FIG. 5 is an enlarged fragmentary elevational view in partial section showing the cover in full line as depressed by the finger of a user who is manipulating a thumbwheel, and with the cover shown in phantom line in its normal position.
Figure 6:
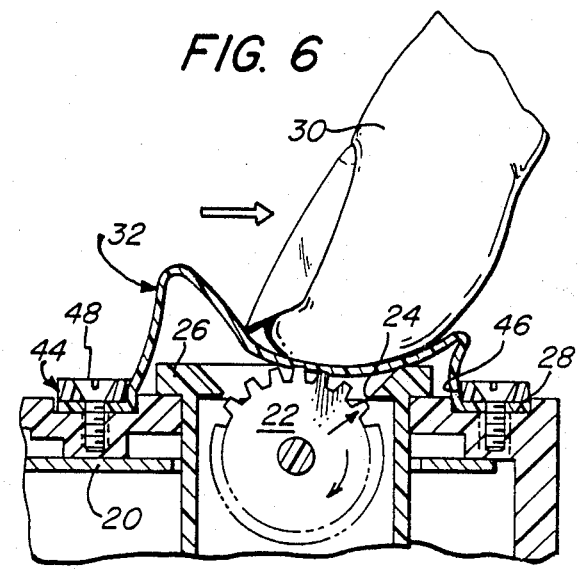
FIG. 6 is a view similar to FIG. 4 showing the cover transversely displaced from the position seen in FIG. 5 and the thumbwheel partially rotated.

Rotatably supported on the case 10 are a pair of thumbwheels 22 for selecting the channels and which are disposed in a mounting assembly 26 which is seated in the aperture 24 in the top panel 12. The upper portion of the periphery of the thumbwheels 22 thus projects above the plane of the top panel 12. As best seen in FIGS. 5 and 6, the top panel 12 has a recess 28 in the surface of the top panel 12 about the aperture 24. The upper periphery of the thumbwheels 22 is in, or only slightly above, the plane defined by the upper surface of the assembly 26 to permit engagement and manipulation by the user's finger 30 as seen in FIGS. 5 and 6.

Seated upon the top panel 12 is a substantially transparent cover generally designated by the numeral 32 which has a pedestal portion 34 defined by a planar top wall 36 and an inclined sidewall 38 extending thereabout. The cover 32 also has a peripheral flange 40 extending outwardly about the base of the sidewall 38 and which seats in the recess 28 of the top panel with its outer edges being closely spaced to the sidewalls of the recess 28.

The cover 32 is elongated and not only overlies the thumbwheels 22 but a series of adjacent toggle switches 42 which are used for channel priority selection, power selection, etc. These are also mounted on the case 10 and extend upwardly through apertures in the top panel 12 within the recess 28. The cover 32 is enlarged transversely in its central portion overlying the thumbwheels 22 for a purpose to be described hereinafter.

Overlying the flange 40 is a clamping plate generally designated by the numeral 44 which has an aperture 46 therein cooperatively configured and dimensioned with respect to the sidewall 38 of the pedestal portion 34 of the cover 32 and the pedestal portion 34 extends therethrough in close fitting relationship. The clamping plate 44 is also dimensioned and configured cooperatively with the margins of the recess 28 in the top panel 12 so that it fits snugly therewithin.

Threaded fasteners 48 extend through cooperating and aligned apertures in the clamping plate 44, cover flange 40, and top panel 12, and are tightened in the top panel 12 to compress the flange 40 and effect a seal between the flange 40 and the top panel 12 about the apertures therein.

As will be readily appreciated, the cover must be relatively transparent to permit viewing of the indicia on the periphery of the thumbwheels, and it must be resiliently deflectable readily by the finger of the user. In this manner, the top cover may be brought down into frictional engagement with the periphery of the thumbwheels and thence moved laterally to effect rotation in either direction. This manipulation is diagrammatically illustrated in FIGS. 5 and 6 of the attached drawing. To achieve this result, there must be a space between the top of the thumbwheels and the bottom surface of the top wall of the cover, and there must be sufficient lateral spacing between the sidewall of the cover and the thumbwheels, so that the required deflection and manipulation can be effected.

Generally, the cover has an overall height of 4.0–9.0 mm, and the clearance between the top of the thumbwheels and the top wall of the cover is within the range of 3.0 to 8.0 mm. The lateral clearance, i.e., in the direction of rotation of the thumbwheels, between the centerline of the thumbwheels and the sidewall of the cover should be at least 7 mm. and may range to 12 mm, and even more. To provide requisite toughness, silicone rubber resins are preferred since they also provide a high degree of resiliently deflectability albeit with some loss of clarity. Generally, the thickness of the cover will be in the range of 0.4 to 0.9 mm.

Although the cover may be of simple rectangular cross section, the amount of resin required can be reduced by reducing the transverse dimension at points spaced longitudinally to either side of the thumbwheels, thus providing the material necessary for deflection and manipulation of the thumbwheels in the critical area and reducing the dimension elsewhere.

As shown in the illustrated embodiment, the cover not only serves to protect the radio from penetration of rain and spray through the apertures in the case for the thumbwheels but also through the apertures for conventional toggle switches which are utilized in connection therewith. Boots are generally provided around rotatable switches of the type shown for the "on/off" and the volume control elements so as to minimize penetration of moisture thereabout.

Thus, it can be seen from the foregoing detailed specification and attached drawing that the transceiver of the present invention provides a highly effective seal for thumbwheels extending above the top panel of the case as well as for any toggle switches which may be additionally provided in the top panel. The cover may be readily fabricated from a resin which provides a high degree of durability commensurate with the necessary resilient deflectability. The components may be readily assembled and disassembled while maintaining the desired sealing characteristics.

Having thus described the invention, what is claimed is:

1. A handheld radio comprising
  (a) a frame supporting electronic components;
  (b) a case surrounding said frame including a top panel with at least one opening therethrough;
  (c) a multiplicity of thumbwheels rotatably supported in said case and having a circumferential portion thereof extending through said opening in said top panel;
  (d) a resiliently deflectable cover disposed on said top panel and having a pedestal portion overlying said thumbwheels including a top wall spaced thereabove and a depending sidewall extending thereabout to said top panel, said cover including a flange extending outwardly about the periphery of said sidewall and along a portion of the surface of said top panel, said cover being fabricated from a relatively transparent synthetic resin and being readily deflectable by a finger of the user of the radio to depress the top wall into frictional engagement with a thumbwheel and thence movable laterally to effect rotation thereof;
  (e) a clamping plate overlying said flange of said cover and having an aperture therein through which said pedestal portion extends; and
  (f) fasteners extending through said clamping plate and cover and into said top panel to provide sealing engagement between said flange and said top panel to prevent rain and spray from entering said case about said thumbwheels.

2. The radio in accordance with claim 1 wherein there are included toggle switches projecting through apertures in said top panel and wherein said top wall of said cover overlies said switches for manipulation thereby.

3. The radio in accordance with claim 1 wherein said resin is a silicone rubber.

4. The radio in accordance with claim 3 wherein said cover has a thickness of about 0.4 mm–0.9 mm.

5. The radio in accordance with claim 1 wherein said sidewall has a height of 4.0 mm–10.0 mm and is spaced above said thumbwheels about 3.0–9.0 mm.

6. The radio in accordance with claim 5 wherein said sidewall of said cover is spaced laterally outwardly from the centerline of said thumbwheels at least about 7.0 mm.

7. The radio in accordance with claim 6 wherein said cover is elongated and said pedestal portion has a portion of enlarged transverse dimension adjacent said thumbwheels.

8. The radio in accordance with claim 1 wherein said top panel has a recess extending about said opening therein and said flange of said cover seats therein.

9. The radio in accordance with claim 1 wherein said radio additionally includes at least one toggle switch projecting upwardly through an opening in said top panel spaced from said thumbwheels and said pedestal portion overlies said switch.

* * * * *